United States Patent
Zabrek

(10) Patent No.: US 6,477,840 B1
(45) Date of Patent: Nov. 12, 2002

(54) TRUINE ENERGY SYSTEM

(76) Inventor: Albert S. Zabrek, 18755 Walkers Choice Rd., Gath, MD (US) 20879

( * ) Notice: Subject to any disclaimer, the term of this patent is extended or adjusted under 35 U.S.C. 154(b) by 0 days.

(21) Appl. No.: 09/514,357

(22) Filed: Feb. 28, 2000

(51) Int. Cl.[7] .............................................. B60K 16/00
(52) U.S. Cl. ................ 60/641.8; 60/641.11; 60/641.15; 60/698
(58) Field of Search .............................. 60/641.1, 641.8, 60/641.11, 641.15, 698

(56) References Cited

U.S. PATENT DOCUMENTS

| | | | | |
|---|---|---|---|---|
| 3,654,759 A | * | 4/1972 | Abbot | 60/641.14 |
| 3,785,144 A | * | 1/1974 | Fairbanks | 60/531 |
| 4,043,315 A | * | 8/1977 | Cooper | 126/270 |
| 4,104,535 A | * | 8/1978 | Bronicki | 290/52 |
| 4,249,083 A | * | 2/1981 | Bitterly | 290/1 R |
| 4,449,515 A | * | 5/1984 | Nilsson, Sr. | 126/430 |
| 4,476,853 A | * | 10/1984 | Arbogast | 60/641.15 X |
| 4,707,990 A | * | 11/1987 | Meijer | 60/641.15 |
| 4,768,607 A | * | 9/1988 | Molina | 180/165 |
| 4,898,519 A | * | 2/1990 | Vanek | 417/379 |
| 5,685,151 A | * | 11/1997 | Ross | 60/641.15 X |

* cited by examiner

Primary Examiner—Hoang Nguyen
(74) Attorney, Agent, or Firm—Smith Patent Office

(57) ABSTRACT

The present invention provides for the conversion of domestic sewage into electric power. The invention also allows for the additional creation of redundant systems through the use of solar magnification and human powered generators that would allow the introduction of clean electrical energy to be generated in combination or as independent systems.

1 Claim, 4 Drawing Sheets

TRUINE ENERGY SYSTEM

BACKGROUND OF THE INVENTION

1. Field of the Invention

This invention relates to a system for conversion of domestic sewage into electric power and render an independent dwelling energy self sufficient.

2. Discussion of the Related Art

The current state of our energy/economic system as a whole is not integrated. At present domestic sewage goes to landfills and processing plants at best or to rivers and oceans at worst but nothing is ever done to extract power potential from this waste. Gas is vented directly and wastefully into the atmosphere, and in doing so never recovered.

A problem attendant to this system is that energy is repeatedly wasted, or worse, expensive manufactured energy must be expended to break this sewage down into nonpolluting waste products. The entire waste, domestic sewage collection and disposal enterprise is extremely expensive and should the present trend continue the burden of our society could become a problem greater than the present method we are incorporating to reasonably dispose of it.

In the recent past there has been much writing and experimentation concerning this very problem some twenty years ago, with the concept of energy self sufficiency. There were gasohol stations and coal gasification projects. There were experiments with solar energy, alcohol fuels and drilling for methane in landfills. They are harvesting waste hear from power plants and other interesting projects but not much came out of it. All industry really worked on seriously was conservation of energy in traditional applications such as home insulation, electric conservation in building and more efficient fossil fuel burning power plants. But no breakthrough although better than the profligate flaring of waste heat and burning of fossil fuels that had always characterized our economy up to this point.

SUMMARY OF THE INVENTION

It is an object of this invention to provide a domestic sewage-to-electric power conversion facility complete with a redundant solar energy and utilization system.

It is an object of this invention to provide a means to use an underutilized energy source in a cost effective way.

It is a further object of this invention to offer, first an alternative energy system that uses an abundant fuel and energy source; the second source, the sun as a battery recharging power source and a modified stationary exercise bicycle as a further redundant energy supply allowing for self sufficiency and good health.

This process in turn could provide a continuous source of clean energy, as opposed the present expensive, and complex, method of nuclear energy. Inherently unstable, and potentially hazardous to surrounding environment, may be subject to hazardous conditions beyond control.

There exists a great deal of hope in other forms of technologically available energy sources. One of these sources is the proposed invention of a solar magnification system that produces electricity by virtue of the sun. This is a result of super heating water, through a method of directing the suns rays, through focusing and magnification of the heat from the sun to many times greater than the temperatures achieved though the use of the technology for solar energy as it is utilized today.

The creation of the super heated steam by the process as described above, in turn propels the blades on a small turbine operating and driving the electric producing generator. The resulting energy is either stored for later use or will travel directly to the appliance on demand.

The by product of this system is releasing small amounts of sterilized steam into the atmosphere. The possibility of the accumulated benefits to the atmosphere through the wide spread use of this system of a literal steam cleaning of air will be the subject of future studies related to this invention.

The solar fuel, producing the power for this system is from a readily available source, by its nature, natural, and life sustaining for the planet.

The above described domestic energy generator and storage system results in the production of pure, non-fossilized, non polluting power for ordinary household use. The system is simple reliable and redundant. It is expected to be manufactured well within an affordable range of the average family. The waste matter serves in most households, as another burden for the already overburdened sewage facilities. By implementation of these systems, energy is produced, waste is consumed, or other natural by producers and medicines and individual citizens can feel the security resulting from their self reliance.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
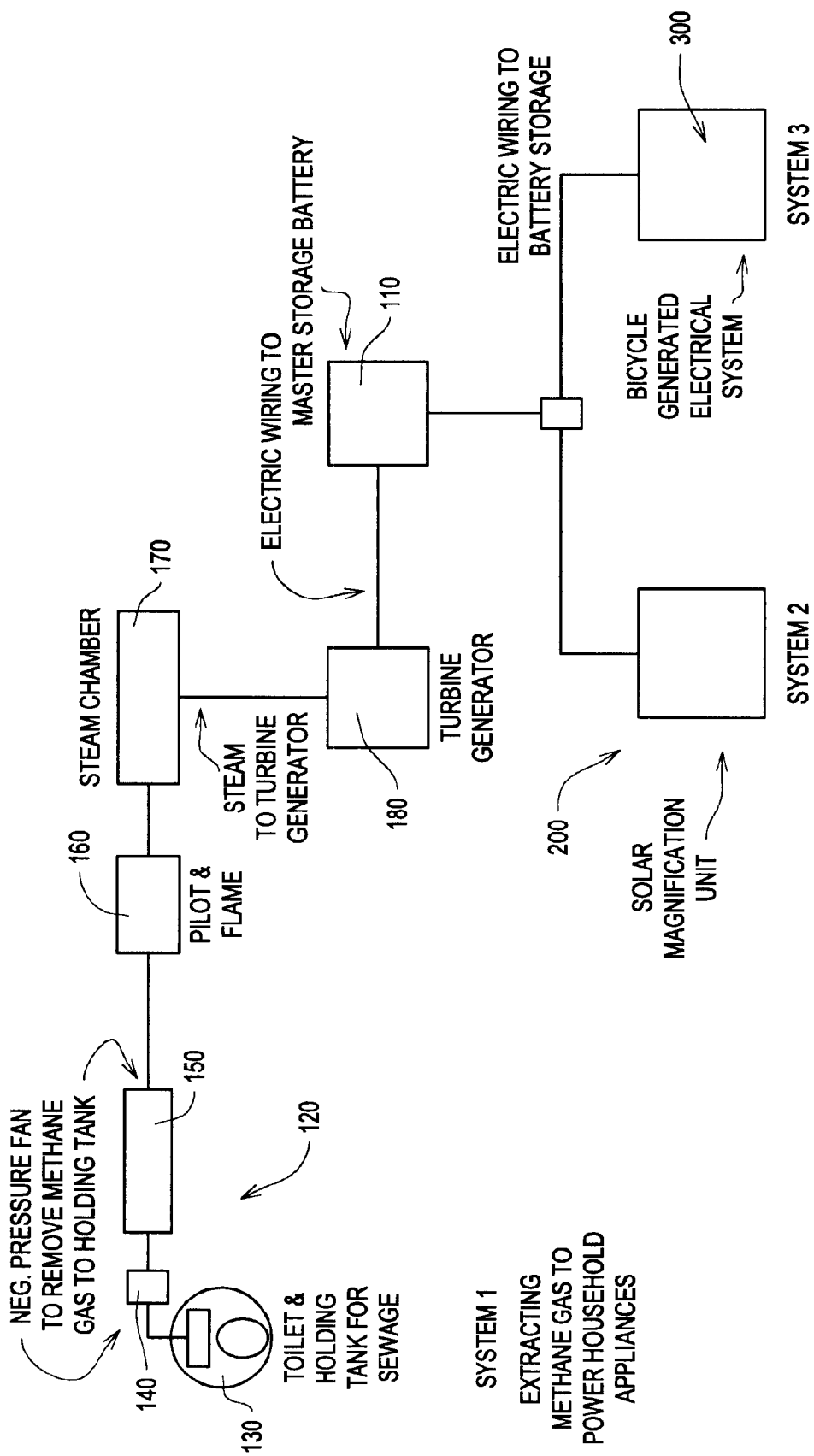
FIG. 1 is a diagram of the entire redundant energy system in accordance with a first embodiment of the solar magnification system.

FIG. 1 discloses three redundant energy systems for supplying electrical energy to a master storage battery 110. The first system 120 is for extracting methane gas to make electricity to power and household appliances. The first system 120 includes a toilet 130 and holding tank 150 connected to a negative pressure fan 140 to remove methane gas. The methane gas is supplied to a pilot and flame chamber 160 where the gas is burned to heat water in steam chamber 170 and the steam is supplied to the steam turbine generator 180. The steam turbine generator 180 generates electrical energy that is sent to the master storage battery 110.

The second system includes the solar magnification unit 200 which also produces electrical energy that is fed to the master storage battery 110.

The third system includes a bicycle generated electrical system 300 that also produces electrical energy that is fed to the master storage battery 110.

Figure 2:
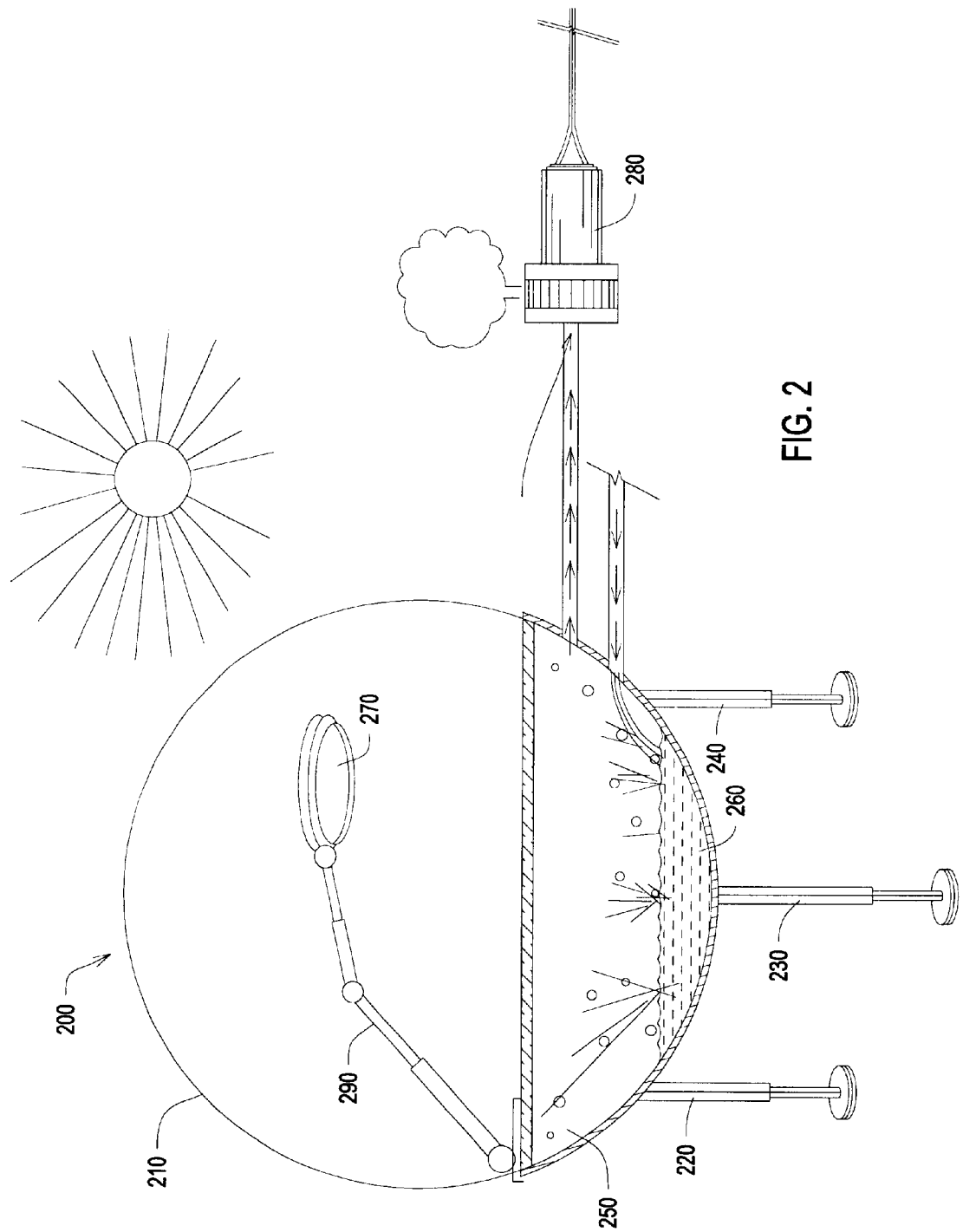
FIG. 2 is the first embodiment of the solar magnification system according to the present invention.
Figure 3:
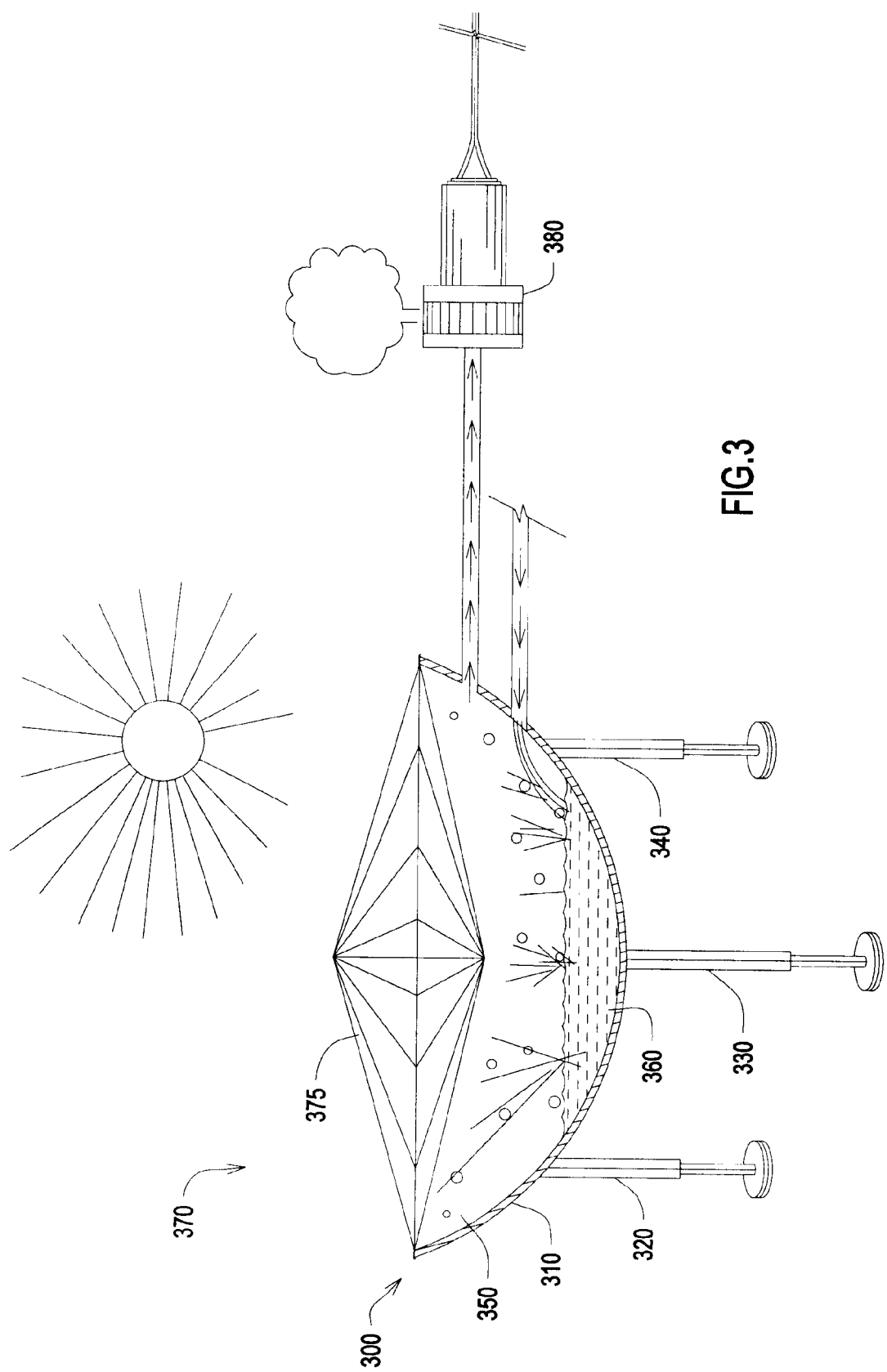
FIG. 3 is a second embodiment of the solar magnification system according to the present invention.
Figure 4:
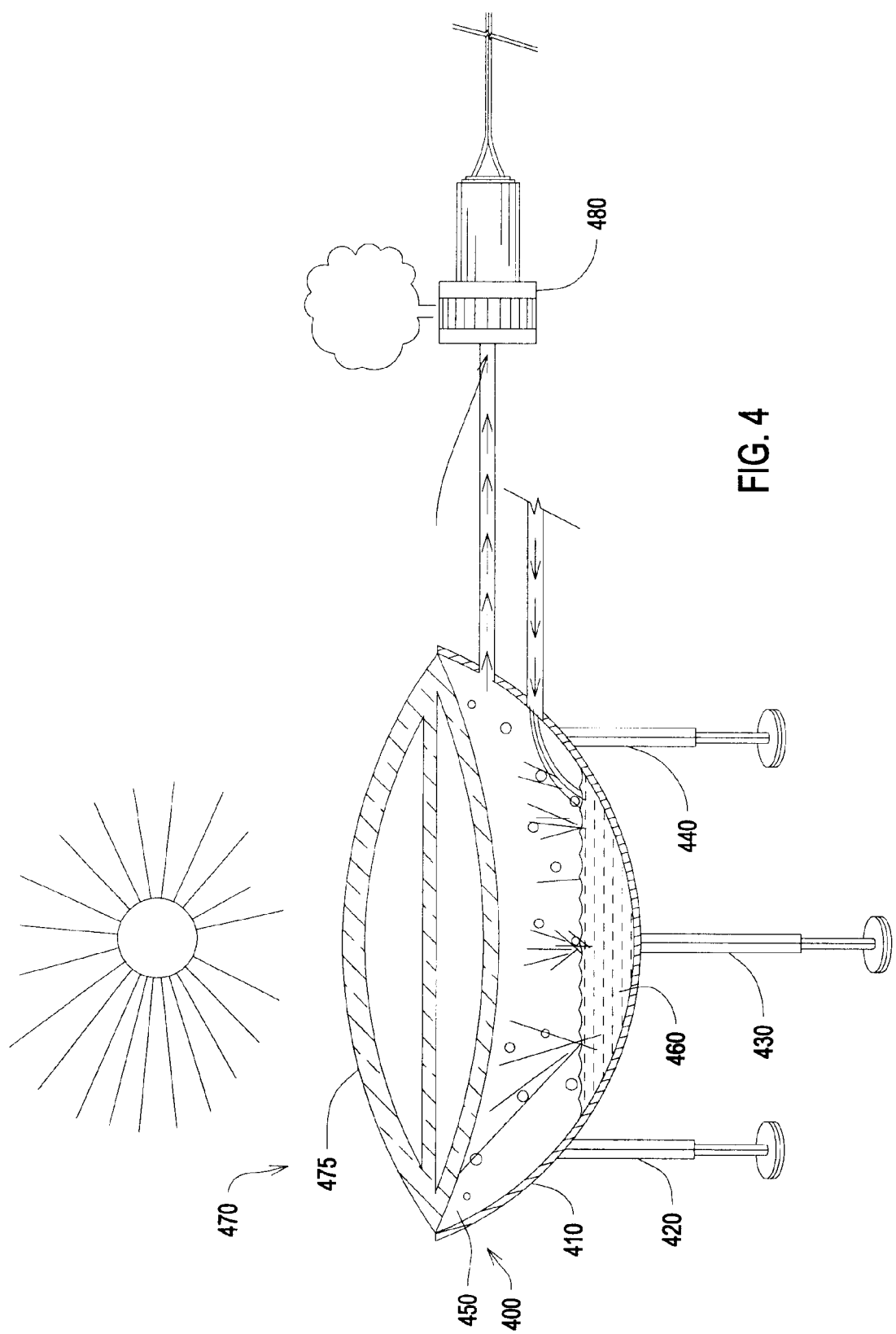
FIG. 4 is a third embodiment of the solar magnification system according to the present invention.

FIGS. 2–4 disclose details of the solar magnification unit that produces steam to drive a steam turbine generator to produce electricity. FIG. 2 shows the solar magnification unit 200 including a container 210 disposed on adjustable legs 220, 230 and 240. The container 210 includes a chamber 250 having a fluid reservoir 260. Disposed above the chamber 250 is a magnification lens unit 270. The magnification lens unit 270 this disposed on an adjustable arm 280. The solar rays are concentrated through the magnification lens unit 270 and this causes the liquid in the reservoir to boil. The steam generated by this process is fed to a steam turbine generator 280 to generate electricity that can be fed to the storage battery.

FIG. 3 is a modified solar magnification unit 300 including a container 310 disposed on adjustable legs 320, 330 and 340. The container 310 includes a chamber 350 having a fluid reservoir 360. Disposed across the top of the chamber 350 is a magnification lens unit 370. In this embodiment the magnification lens unit 370 comprises a prism 375. The prism 375 concentrates the solar rays and causes the liquid in the reservoir to boil. The steam generated by this process is fed to the steam turbine generator 380 to generate electricity that can be fed to the storage battery.

FIG. 4 is a modified solar magnification unit 400 including a container 410 disposed on adjustable legs 420, 430 and 440. The container 410 and includes a chamber 450 having a fluid reservoir 460. Disposed across the top of the chamber 450 is a magnification lens unit 470. In this embodiment, the magnification lens unit 478 comprises a lens 475. The lens 475 concentrates the solar rays and causes the liquid in the reservoir to boil. The steam generated by this process is fed to the steam turbine generator 480 to generate electricity that can be fed to the storage battery.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

I claim:

1. A redundant energy system comprising three energy systems:

a first energy system comprising a bicycle generated electrical system for producing electrical energy that will be stored in a battery;

a second energy system comprising a methane gas burning steam generator to produce electrical energy that will be stored in the battery;

a third energy system comprising a solar magnification system including: a container having a fluid reservoir, said container having a chamber: a magnification lens disposed on an adjustable arm above said chamber for concentrating solar rays to generate steam in said chamber; adjustable legs attached to said container; and a pipe connected to said chamber for passing steam to a steam-power turbine generator to produce electrical energy that it will be stored in the battery.

* * * * *